(12) United States Patent
Tanemura et al.

(10) Patent No.: US 11,157,106 B2
(45) Date of Patent: Oct. 26, 2021

(54) PIEZORESISTIVE SENSING INPUT DEVICE

(71) Applicant: SYNAPTICS INCORPORATED, San Jose, CA (US)

(72) Inventors: Tetsuo Tanemura, Tokyo (JP); Seiki Takahashi, Tokyo (JP); Joseph Kurth Reynolds, San Jose, CA (US); Petr Shepelev, Campbell, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/189,486

(22) Filed: Nov. 13, 2018

(65) Prior Publication Data

US 2020/0150813 A1 May 14, 2020

(51) Int. Cl.
| | |
|---|---|
| *G06F 3/042* | (2006.01) |
| *G06F 3/041* | (2006.01) |
| *G06F 3/044* | (2006.01) |
| *G01L 1/18* | (2006.01) |
| *G06F 3/047* | (2006.01) |
| G09G 3/3208 | (2016.01) |
| G09G 3/36 | (2006.01) |

(52) U.S. Cl.
CPC ............ *G06F 3/0414* (2013.01); *G01L 1/18* (2013.01); *G06F 3/044* (2013.01); *G06F 3/047* (2013.01); *G06F 3/0412* (2013.01); *G06F 3/0416* (2013.01); *G09G 3/3208* (2013.01); *G09G 3/36* (2013.01)

(58) Field of Classification Search
CPC ...... G06F 3/0414; G06F 3/044; G06F 3/0416; G06F 3/047; G06F 2203/04101; G06F 2203/04108; G06F 2203/04105; G06F 2203/04103
See application file for complete search history.

(56) References Cited

U.S. PATENT DOCUMENTS

| | | | |
|---|---|---|---|
| 8,519,449 B2 | 8/2013 | Dumitru et al. | |
| 2011/0260994 A1* | 10/2011 | Saynac | G06F 3/0414 345/173 |

(Continued)

OTHER PUBLICATIONS

Zhao, et al. "Design, fabrication and characterization of a high-sensitivity pressure sensor based on nano-polysilicon thin film transistors", AIP Advances 5, 127216 (2015) (Received Aug. 11, 2015; accepted Dec. 7, 2015; published online Dec. 17, 2015, consists of 9 pages.

(Continued)

*Primary Examiner* — William Boddie
*Assistant Examiner* — Jeffrey Parker
(74) *Attorney, Agent, or Firm* — Leydig, Voit & Mayer, Ltd.

(57) ABSTRACT

A system and method for input sensing comprises a display device having at least one piezoresistive sensing transistor. During a first period, a first resulting signal is received with a first data line by driving a first piezoresistive sensing transistor of a first subpixel of the display device with a first select signal. The first resulting signal corresponds to a change in resistance of the first piezoresistive sensing transistor. Further, at least one of force information and positional information associated with an input object may be determined at least partially based on the change in resistance.

19 Claims, 11 Drawing Sheets

(56) References Cited

U.S. PATENT DOCUMENTS

| | | | |
|---|---|---|---|
| 2011/0310079 A1* | 12/2011 | Kim | G09G 3/3433 |
| | | | 345/211 |
| 2014/0070338 A1* | 3/2014 | Wang | G06F 3/0414 |
| | | | 257/415 |
| 2014/0240621 A1* | 8/2014 | Klinghult | G06F 3/044 |
| | | | 349/12 |
| 2016/0274397 A1* | 9/2016 | Zhou | G06F 3/044 |
| 2017/0090638 A1* | 3/2017 | Vosgueritchian | H01L 27/1218 |
| 2017/0200037 A1* | 7/2017 | Hong | G06F 3/0446 |
| 2018/0275795 A1 | 9/2018 | Takahashi | |
| 2018/0286989 A1* | 10/2018 | Zhang | H01L 27/124 |
| 2019/0027674 A1* | 1/2019 | Zhang | H01L 41/0825 |
| 2019/0243498 A1* | 8/2019 | Wang | G06F 3/0412 |

OTHER PUBLICATIONS

Sohn, et al., "Effects of TFT mobility variation in the threshold voltage compensation circuit of the OLED display", Journal of Information Display, 2017, vol. 18, No. 1, 25-30, http://dx.doi.org/10.1080/15980316.2016.1259128.

Park, et al., "53.5: High-Speed AMOLED Pixel Circuit and Driving Scheme" *SID 10 DIGEST*, 2010 • pp. 806-809.

\* cited by examiner

PIEZORESISTIVE SENSING INPUT DEVICE

BACKGROUND

Field

Embodiments disclosed herein generally relate to electronic devices, and more specifically, to piezoresistive sensing input devices.

Description of the Related Art

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones.

SUMMARY

In one embodiment, a method for input sensing comprises receiving, during a first period, a first resulting signal from a first data line by driving a first piezoresistive sensing transistor of a first subpixel of a display device with a first select signal, the first resulting signal corresponding to a change in resistance of the first piezoresistive sensing transistor, and determining, at least partially based on the change in resistance, at least one of force information and positional information for a first input object.

In one embodiment, a sensing device comprises a plurality of data lines of a display device, and a plurality of subpixels. The plurality of subpixels is coupled to the plurality of data lines, wherein a first subpixel of the plurality of subpixels is coupled to a first data line of the plurality of data lines. The first subpixel comprises a first transistor configured to couple a first data signal from the first data line to the first subpixel in response to receiving a first select signal during a first period, and a piezoresistive sensing transistor configured to output a resulting signal onto the first data line in response to receiving a second select signal during a second period, wherein the resulting signal corresponds to a change in resistance of the piezoresistive sensing transistor.

In one embodiment, a processing system for an input device comprises a display driver module and a sensor module. The display driver module is configured to drive a first select signal onto a first transistor of a first subpixel of a display device during a first period, and drive a first data signal onto a first data line of the display device coupled to the first subpixel during the first period. The sensor module comprises sensor circuitry and is configured to drive a second select signal onto a piezoresistive sensing transistor of the first subpixel during a second period, and receive a first resulting signal from the first data line during the second period, the first resulting signal corresponding to a change in resistance of the piezoresistive sensing transistor.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1:
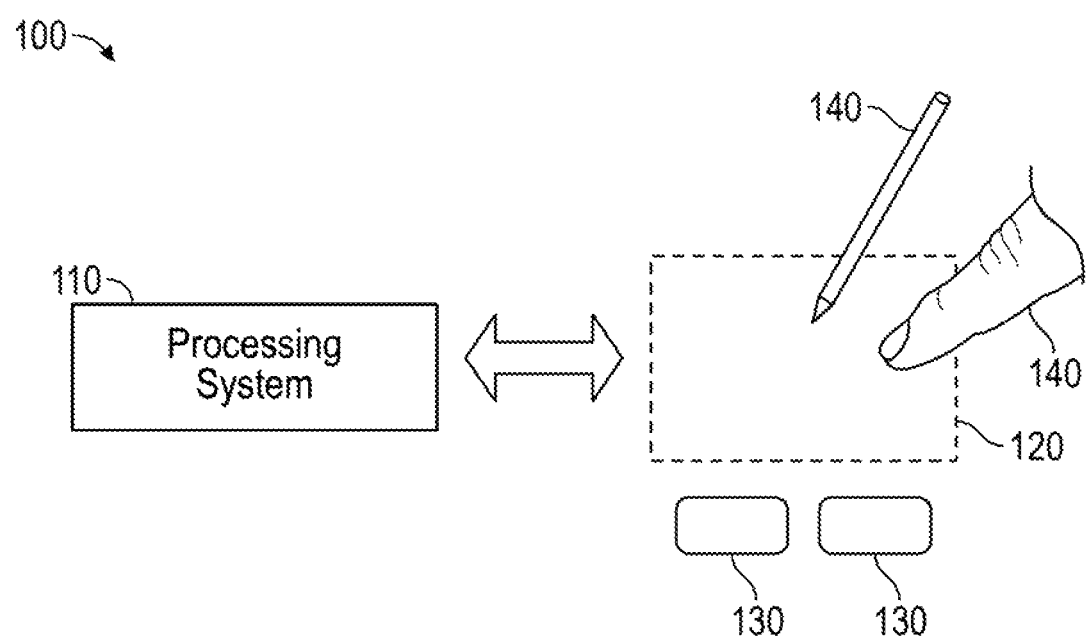
FIG. 1 is a schematic block diagram of an input device, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

In various embodiments, input devices configured for force sensing may have to choose from one or more tradeoffs. For example, input devices that are able track precise locations of an input force or forces may be more complex and have increased costs as compared to input devices that do not include force sensing capabilities. Alternatively, various input objects forgo the ability to track the precise location of an input force or forces to include force sensing capabilities without significantly increasing the cost of the input device. However, by augmenting the transistor structure of a display device within the thin-film-transistor (TFT) layers, force sensing and touch sensing capabilities may be integrated within a display device without significantly increasing the cost of the corresponding device. Further, as the transistor structure may be augmented at the subpixel level, the input device is able to track precise locations of the input force or forces.

Turning now to the Figures, FIG. 1 is a block diagram of an exemplary input device 100, in accordance with embodiments of the disclosure. The input device 100 may be configured to provide input to an electronic system (not shown). As used in this document, the term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices, e.g., remote controllers and mice, and data output devices, e.g., display screens and printers. Other examples include remote terminals, kiosks, and video game machines, e.g., video game consoles, portable gaming devices, and the like. Other examples include communication devices, e.g., cellular phones such as smart phones, and media devices, e.g., recorders, editors, and players such as televisions, set-top boxes, music players, digital photo frames, and digital cameras. Additionally, the electronic system could be a host or a slave to the input device. The electronic system may also be referred to as electronic device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a sensor device configured to sense input provided by one or more input objects 140. An exemplary proximity sensor device may be a touchpad, a touch screen, a touch sensor device and the like.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (in another embodiment, with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) directly by causing one or more actions. Example actions include changing operation modes, as well as GUI actions such as cursor movement, selection, menu navigation, and other functions. In some embodiments, the processing system 110 provides information about the input (or lack of input) to some part of the electronic system, e.g., to a central processing system of the electronic system that is separate from the processing system 110, if such a separate central processing system exists. In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input). The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

"Force information" as used herein is intended to broadly encompass force information regardless of format. For example, the force information can be provided as a vector or scalar quantity. As another example, the force information can be provided as an indication that determined force has or has not crossed a threshold amount. Further, the force information may comprise force information and can also include time history components. Further, force information may refer to binary and/or multi-level force information.

In some embodiments, the input device 100 is implemented with additional input components that are operated by the processing system 110 or by some other processing system. These additional input components may provide redundant functionality for sensing input or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of a display screen. For example, the sensing region 120 may overlap at least a portion of an active area of a display screen. In one embodiment, the sensing region 120 corresponds to a region of the input device 100 where input applied by input objects may be detected. In other embodiments, the sensing region 120 corresponds to a region of the input device where both inputs applied by input objects and input objects proximate the input device by be detected. The active area of the display screen may correspond to a portion of the display screen where images are updated.

It should be understood that while many embodiments of the disclosure are described in the context of a fully functioning apparatus, the mechanisms of the present disclosure are capable of being distributed as a program product, e.g., software, in a variety of forms. For example, the mechanisms of the present disclosure may be implemented and distributed as a software program on information bearing media that are readable by electronic processors, e.g., non-transitory computer-readable and/or recordable/writable information bearing media readable by the processing system 110. Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
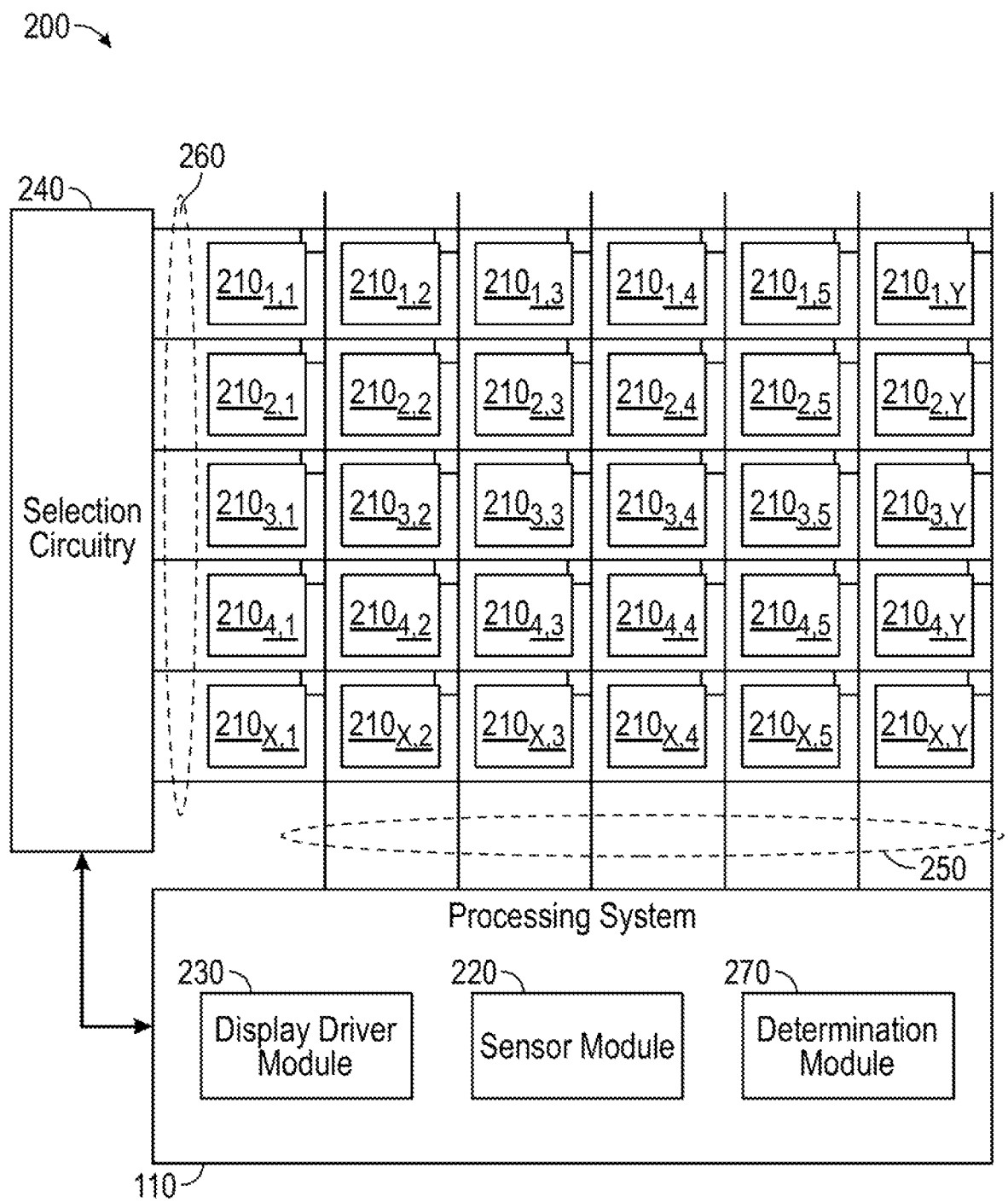
FIG. 2A illustrates an example input device, according to one or more embodiments.

FIG. 2A illustrates an example display device 200 configured to function as an input device, e.g., the input device 100, according to one or more embodiments. The display device 200 may include subpixels 210, the processing system 110 and selection circuitry 240. The subpixels 210 may be coupled to the processing system 110 via data lines 250 and to the selection circuitry 240 via select lines 260. In various embodiments, the data lines 250 may be referred to as source electrodes and/or source lines and the select lines 260 may be referred to as scan lines, gate lines, and/or gate electrodes.

The subpixels 210 may be arranged in a plurality of rows and columns as illustrated, or, in other embodiments, the subpixels 210 may be arranged in other orientations. Further, the subpixels 210 may form both a display area and the sensing region 120 of the display device 200. In one embodiment, updating the subpixels 210 updates an image displayed by the display device 200. The subpixels 210 may be updated by selecting subpixels by driving select signals onto the select lines 260 and driving subpixel data signals onto corresponding ones of the data lines 250.

The subpixels 210 may include one or more transistors configured to activate and deactivate corresponding subpixels 210 for updating. In one embodiment, a first selection signal is driven onto a select line of the select lines 260 to activate each corresponding subpixel. Each activated subpixel may be updated with a subpixel data signal driven onto a corresponding one of the data lines 250.

In various embodiments, while each subpixel 210 is illustrated as being coupled to a single select line, each subpixel may be coupled to a plurality of select lines that may be used to control updating each subpixel. In such embodiments, the select lines may be driven at different times with different select signals to control the update timing of the subpixels. Further, one or more of the select lines 260 may be disposed within a different metal layer of the display device 200 than another one of the select lines 260.

In one embodiment, the display device 200 may be a liquid crystal display (LCD) device. In such an embodiment, each of subpixels 210 may comprise a subpixel electrode that is coupled to a corresponding select line or lines and a data line via one or more transistors. During updating, a subpixel data signal is applied to each activated subpixel electrode to drive the subpixel electrode to a specified voltage level. The subpixel electrodes may be disposed within a subpixel electrode layer. An LCD device additionally includes a common voltage electrode, e.g. Vcom electrode, which is driven to a voltage level by the processing system 110 for display updating and a liquid crystal portions that may be commonly or individually driven for display updating. The common voltage electrode may comprise of one or more segmented regions. The liquid crystal material is disposed such that the properties of the liquid crystal material may be affected by the voltage difference between the pixel electrodes and the Vcom electrode. In one embodiment, the liquid crystal material is disposed between the subpixel electrode layer and the Vcom electrode. In another embodiment, the liquid crystal material is disposed above both of the subpixel electrode layer and the Vcom electrode.

In another embodiment, the display device 200 may be an organic light emitting diode (OLED) display device. In such an embodiment, each of the subpixels 210 may comprise an anode electrode that is coupled to a corresponding select line or lines and a data line via one or more transistors. A subpixel data signal or signals is applied to each activated anode electrode to drive the anode electrode to a specified voltage level. An OLED display device additionally includes a cathode electrode that is driven to a voltage level by the processing system 110 for display updating and one or more organic layers. The organic layers may include one or more emissive layers and conductive layers. Further, organic layers may be disposed between the anode and cathode electrodes. In one or more embodiments, each subpixel may include a cathode electrode and the anode electrode is disposed such that the organic materials are between the cathode and anode.

In one or more embodiments, the display device 200 may be any type of display device that employs a matrix of transistors and data lines which are configured to control current flowing between a common voltage source and the data lines. For example, the display device 200 may be one of a MicroLED display device, electroluminescent display device, electronic paper display device, or the like.

In one embodiment, the display driver module 230 of the processing system 110 includes display driver circuitry and is configured to drive each of the data lines with subpixel data signals to update the subpixels. The display driver module 230 may include a plurality of source drivers coupled to and configured to drive the data lines 250. In various embodiments, each source driver may include one or more buffers that are configured to drive the data lines 250.

The processing system 110 may be communicatively coupled to the selection circuitry 240, and configured to provide control signals to the selection circuitry 240 to control the selection signals driven onto the select lines 260. The selection circuitry 240 may include one or more shift registers and control logic to control which select line is activated and which select line is deactivated to perform displaying updating. The selection circuitry 240 may be included separate from the processing system 110, as illustrated, or included as part of the processing system 110.

In one or more embodiments, the display device 200 may be configured to detect one or more input objects. For example, one or more of the subpixels 210 may include one or more transistors having a resistance that varies in response to strain caused by input of an input object. Such transistors may be referred to as piezoresistive sensing transistors and piezoresistive elements. As the variable resistance changes, the current that flows through the piezoresistive sensing transistors varies. The current can be measured to determine a measurement of a change in resistance of a piezoresistive sensing transistor. In one embodiment, the piezoresistive sensing transistor leverages a piezoresistive effect on the gate channel (or gate) of the transistor in response to force applied to the transistor.

The sensor module 220 may be coupled to the piezoresistive sensing transistors via the data lines 250. The sensor module 220 may include sensor circuitry and is configured to receive resulting signals from the piezoresistive sensing transistors. The resulting signals may be current signals that correspond to a resistance of the piezoresistive sensing transistors. The resulting signals may be processed by the sensor module 220 and communicated to the determination module 270 to determine a change in resistance of the piezoresistive sensing transistors. The sensor circuitry may include one or more analog front ends (AFEs) and other circuitry elements. In one embodiment, each data line 250 may be coupled to a different AFE. In various embodiments, two or more data lines may be coupled to a common AFE. In one embodiment, the sensor module 220 is configured to receive a resulting signal from a piezoresistive sensing transistor, process the resulting signal and communicate the processed resulting signal to the determination module 270. Processing the resulting signals may include filtering and other signal conditioning techniques.

The determination module 270 may be configured to receive the resulting signals from the sensor module 220 and determine measurements of changes in resistance from the resulting signals. In one embodiment, the determination module 270 is configured to determine force information and/or positional information for one or more input objects based on the measurements of changes in resistance. In one embodiment, the positional information may be determined in addition or alternatively to the force information. In various embodiments, the determination module 270 receives the processed resulting signals from the sensor module 220, compares the processed resulting signals to a baseline, and determines measurements of changes in resistance. Further, the determination module 270 may be configured to determine a two dimensional input image from the measurements of the changes in resistance. The input image may be utilized to determine force information and/or positional information of one or more input objects.

In one embodiment, the data lines 250 are shared between display updating and input sensing. In such an embodiment, the data lines 250 are configured to communicate subpixel data signals to each subpixel during display updating and communicate resulting signals from the piezoresistive sensing transistors to the sensor module 220 during input sensing. Input sensing may correspond to any combination of force sensing and touch sensing. In one embodiment, performing force sensing corresponds to determining force information for an input object and performing touch sensing corresponds to determining positional information for an input object. In one embodiment, the data lines 250 are time multiplexed between communicating subpixel data signals and resulting signals. For example, during a first time period, the display driver module 230 drives the subpixel $210_{1,1}$ via a first data line with a first subpixel data signal, and, during a second time period that is non-overlapping with the first time period, the sensor module 220 is receives a first resulting signal from the subpixel $210_{1,1}$ via the first data line. In one embodiment, the response from each piezoresistive sensing transistor 212 provides sufficient gain such that each subpixel may be independently utilized to form a two-dimensional input image.

The processing system 110 may couple each data line 250 with the display driver module 230 for display updating and with the sensor module 220 for input sensing. Further, the display driver module 230 and sensor module 220 may communicate one or more control or synchronization signals between each other to control when display updating and input sensing are performed.

In various embodiments, the data lines 250 may include a first plurality of data lines configured to provide subpixel data signals to each subpixel 210 and a second plurality of data lines configured to communicate resulting signals from each subpixel 210 to the sensor module 220. The first plurality and second pluralities of data lines may be disposed in a common metal layer of the display device or in different layers of the display device.

Input sensing and display updating may occur during non-overlapping periods. The input sensing periods may correspond to non-display update periods of a display frame. Further, a display frame may correspond to time period during which each of subpixels 210 of the display device 200 is updated. In one embodiment, each row of subpixels corresponds to a display line of a display frame. In other embodiments, the subpixels coupled to each individual select line correspond to a display line of a display frame. During a display frame, the display lines are selected and updated one at time, during display line update periods. In one or more embodiments, a horizontal blanking period occurs between display line update periods. Further, before the first display line update period and/or after the last display line update period, a vertical blanking period may occur, during which display lines are not driven for display updating. The horizontal and/or vertical blanking periods may also be referred to as non-display update periods.

In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. Further, such a blanking period may be at least as long as a display update period. In one embodiment, the non-display update period may correspond to a period of time after a subpixel is activated for display updating, but before the subpixel enters an emission stage. For example, the non-display update period may correspond to a period of time after a subpixel is activated but before the subpixel is initialized and/or programmed.

In one or more embodiment, the processing system 110 may be configured to perform input sensing during any one or more of or any combination of the different non-display update times. Further, synchronization signals may be shared between the sensor module 220 and the display driver module 230 to provide accurate control of display updating and input sensing periods.

Figure 2B:
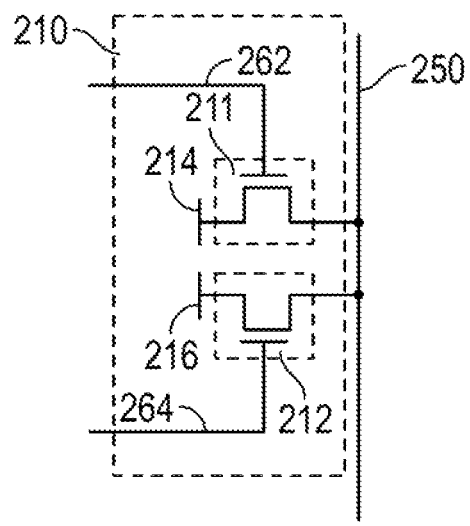
FIG. 2B illustrates an example subpixel, according to one or more embodiments.

FIG. 2B illustrates an example schematic of a subpixel 210, according to one or more embodiments. As illustrated, subpixel 210 may include at least two transistors, i.e., a transistor 211 and a piezoresistive sensing transistor 212. A first node of the transistor 211 may be coupled to the select line 262, and a second node of the transistor 211 may be coupled to the data line 250 and a first node the piezoresistive sensing transistor 212 may be coupled to the select line 264 and a second node of the piezoresistive sensing transistor 212 may be coupled to the data line 250. Further, the transistor 211 may be coupled to a display electrode 214, and the piezoresistive sensing transistor 212 may be coupled to a supply voltage 216. In one embodiment, a gate of the piezoresistive sensing transistor 212 is coupled to the select line 264, and a signal applied to the select line may be utilized as a valve to operate the piezoresistive sensing transistor 212 in as a resistor for input sensing. Further, during display updating and/or input sensing using other piezoresistive sensing transistors along the same data line (e.g., the data line 250), the signal applied to select line 264 may be driven low for NMOS type transistors or high for PMOS type transistors to prevent current flow through the two nodes of the piezoresistive sensing transistor 212.

In an LCD device, the display electrode 214 may include a subpixel electrode and the supply voltage may include a common voltage driven on Vcom electrode. In one embodiment, the piezoresistive sensing transistor 212 is coupled to the Vcom electrode and the data line 250. Further, a change in resistance of the piezoresistive sensing transistor 212 may correspond to an amount of current flowing (e.g., a resulting signal) through the piezoresistive sensing transistor 212, induced by a voltage drop between the Vcom electrode and the data line 250.

In an OLED display device, the display electrode 214 may include an anode or cathode electrode, and the supply voltage 216 may include a supply voltage provided by a power source. In one or more embodiments, for an OLED display device, the transistor 211 may be one of a plurality of transistors that are configured to control the voltage on the anode or cathode electrode, the piezoresistive sensing transistor 212 may be coupled to the power source (e.g., supply voltage 751 of FIG. 7) via one or more routings disposed within the display device. In one embodiment, the piezoresistive sensing transistor 212 is coupled to the power source (e.g., supply voltage 751) and the data line 250. Further, a change in resistance of the piezoresistive sensing transistor 212 may correspond to an amount of current flowing (e.g., a resulting signal) through the piezoresistive sensing transistor 212, induced by a voltage drop between the power source and the data line 250.

As is illustrated, the gate of the transistor 211 is coupled to the select line 262. The transistor 211 may be turned on and off by applying a select signal to the gate of the transistor 211 via the select line 262. In one embodiment, the transistor 211 is a NMOS type and is turned on when the select signal is a high voltage signal and turned off when the select signal is a low voltage signal. In another embodiment, transistor is PMOS type and is turned on when the select signal is a low voltage signal and turned off when the select signal is a high voltage signal.

In a turned-on state, the transistor 211 couples a subpixel data signal applied to the data line 250 to the display electrode 214. In a turned-off state, the transistor 211 prevents a data signal applied to the data line 250 from being coupled to the display electrode 214.

The transistor 211 is operated in a turned-on state during display updating. For example, when the transistor 211 is turned-on, the subpixel 210 of the display device 200 may be updated and when the transistor 211 is turned-off, the subpixel 210 may be not updated.

The piezoresistive sensing transistor 212 includes a gate coupled to the select line 264. The operating state of the piezoresistive sensing transistor 212 may be varied based on the voltage level of the select signal driven onto the select line 264. For example, the piezoresistive sensing transistor 212 may be operated in a turned-on state, and operated in a turned-off state depending of the voltage level of the select signal. Further, the piezoresistive sensing transistor 212 may be operated in a linear range by varying the voltage level of the select signal such that the piezoresistive sensing transistor 212 functions as a resistor. In one embodiment, the piezoresistive sensing transistor 212 is a NMOS type and is turned on when the select signal is a high voltage signal and turned off when the select signal is a low voltage signal. In another embodiment, the piezoresistive sensing transistor 212 is a PMOS type and is turned on when the select signal is a low voltage signal and turned off when the select signal is a high voltage signal. In either embodiment, the piezoresistive sensing transistor 212 may be operated in a linear range by applying a voltage that is between the high voltage signal and the low voltage signal. For example, the piezoresistive sensing transistor 212 may be driven with a voltage that is the average of the voltage of the high voltage signal and the low voltage signal to the operate piezoresistive sensing transistor 212 in the linear range. Further, the piezoresistive sensing transistor 212 may be driven with a voltage that is greater than or less than the average of the voltages of the high voltage signal and the low voltage signal to operate piezoresistive sensing transistor 212 in the linear range. In one embodiment, piezoresistive sensing transistor is driven with 5 volts or less when it is configured to function as a resistor.

In one embodiment, a select signal having high voltage may be referred to as a gate high voltage, $V_{GH}$, signal and a select signal having a low voltage may be referred to as a gate low voltage, $V_{GL}$, signal. Further, the high voltage level may be in the range of about 15 to about 25 volts and the low voltage level may be in the range of about −15 to about −5 volts.

The piezoresistive sensing transistor 212 may be driven such that it operates in a linear range and functions as a resistor. Further, in response to strain caused by an input force, the resistance of the piezoresistive sensing transistor 212 may be varied. The input force may correspond to an input applied by an input object. In one embodiment, as the resistance of the piezoresistive sensing transistor 212 varies, a change in current is induced across a voltage drop between the corresponding data line and a supply voltage.

The piezoresistive sensing transistor 212 may differ from the transistor 211 in one or more properties. For example, in one embodiment, the doping characteristics of the piezoresistive sensing transistor 212 are higher than that of the transistor 211. Further, the piezoresistive sensing transistor 212 may be smaller in size than the transistor 211. In one embodiment, the piezoresistive sensing transistor 212 may be smaller than that of the transistor 211 as the current flow through force the piezoresistive sensing transistor 212 is less than that the transistor 211. For example, the current flowing through the piezoresistive sensing transistor 212 may be a few micro amps. In one embodiment, the resistance of the piezoresistive sensing transistor 212 may be determined by at least one of the doping characteristics of the transistor, the size of the transistor and the voltage driven on to the transistor. In one or more embodiments, to function as a piezoresistive sensor with sufficiently high gauge factor, the channel resistance of the piezoresistive sensing transistor is in a range of about one or more kilo ohms to about one or more mega ohms. Further, the resistance of the piezoresistive sensing transistor 212 may be in a range of about 100 kilo ohms to about at least 1 mega ohm.

Figure 3:
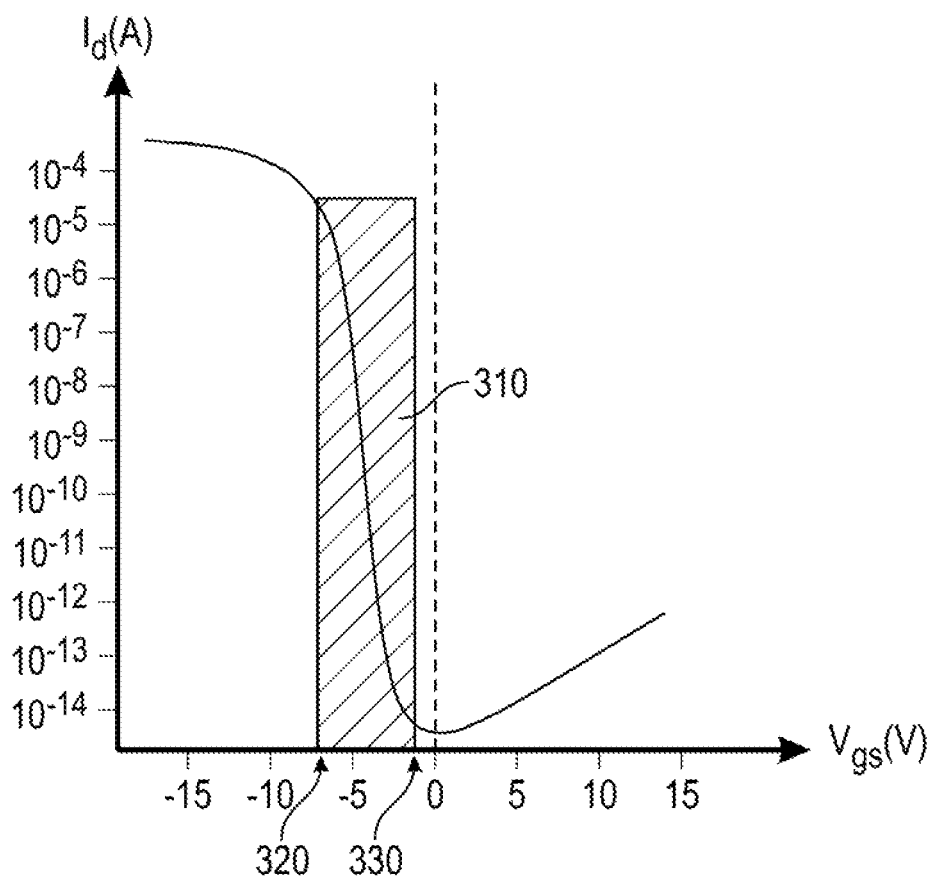
FIG. 3 illustrates a current output curve for a transistor, according to one or more embodiments.

FIG. 3 illustrates an example current output curve for a transistor (such as the transistor 211 and/or the piezoresistive sensing transistor 212). In one embodiment, the current output curve of FIG. 3 may be applicable to any transistor within the display device 200. In FIG. 3 an example operating point of a transistor is also illustrated. The graph corresponds to a PMOS transistor implementation. In a NMOS implementation, the curve would be flipped about the Y axis (i.e., the axis labeled $I_d(A)$). The example operating point of the transistor may be the linear range as illustrated. The linear range may be designed or tuned based on parameters such as: surface charge density which is determined based on gate voltage and/or dielectric material; supply voltage; transistor size; and carrier mobility determined by doping density. In one embodiment, the change in drain current $I_d$ as a function of change in L (strain) is measured by a sensor module (such as the sensor module 220) to determine a measurement of a change in resistance of the piezoresistive sensing transistor caused by an force applied by an input object. Accordingly, the absolute value of the drain source voltage is maximized such that the transistor remains in the linear range. In one or more embodiment, to further increase sensitivity of the piezoresistive sensing transistor, the doping concentration may be selected to be a high value in order to minimize temperature dependency of the piezoresistive sensing transistor. In other words, doping may be used not so much to increase sensitivity, but rather to maintain thermal independency of the piezoresistive sensing transistor. In one embodiment, the drain current, $I_d$, corresponds to the gate capacitance per unit area, the turn-off threshold voltage, the width of the gate, the length of the gate, and the carrier mobility. As can be seen from FIG. 3, $I_d$ corresponds to $V_{gs}$. In one embodiment, for a PMOS transistor implementation, the higher current bound 320 of the linear range corresponds to $V_{DS}$ (drain source voltage)+$V_{th}$ (turn-off threshold voltage), and the lower current bound 330 of the linear range corresponds to $V_{th}$. $V_{th}$ may be about −2 volts to about 0 volts. In a NMOS transistor implementation, the higher and lower current bounds would be the same as those described above in relation to a PMOS transistor implementation, however, $V_{th}$ would be a positive value.

Referring back to FIGS. 2 and 3, in some embodiments, the piezoresistive sensing transistors of each subpixel 210 are scanned for input sensing. That is, in one embodiment, one or more of the piezoresistive sensing transistors 212 may be operated for input sensing at a time. The piezoresistive sensing transistors 212 may be operated such that one is operated for input sensing at one time, or multiple are operated for input sensing at the same time. The resulting signals received from each piezoresistive sensing transistor may be used to determine measurements of a change in resistance corresponding to each piezoresistive sensing transistor. The sensor module 220 may be configured to receive with the piezoresistive sensing transistors 212 in a scanning fashion and/or a multiplexed fashion. In one embodiment, one or more piezoresistive sensing transistors 212 are coupled to a common receiver of the sensor module 220 via a switching element such as a multiplexer or the like. In one embodiment, the receiver of the sensor module 220 may include an analog front end (AFE).

In one embodiment, "scanning" the piezoresistive sensing transistors 212 to determine the changes in resistance comprises receiving resulting signals from one or more rows of the subpixels 210 at a time. In another embodiment, the piezoresistive sensing transistor 212 may be operated such that more than one is received with at a time. In such embodiments, a measurement of a change in resistance for multiple piezoresistive sensing transistors may be simultaneously determined.

In one embodiment each of the piezoresistive sensing transistors 212 is simultaneously received with. In such an embodiment, a total force for the entire input device may be determined. In various embodiments, the processing system 110 may configured to selectively receive from a portion of the piezoresistive sensing transistors 212. For example, the piezoresistive sensing transistors 212 may be selected based on, but not limited to, an application running on the host processor, a status of the input device, and an operating mode of the sensing device.

A set of measurements from the piezoresistive sensing transistors 212 form a "input image" (also "input frame") representative of a change in resistance of each measured subpixel. Each piezoresistive sensing transistor may correspond to a pixel of the input image. In other embodiments, multiple piezoresistive sensing transistors may be combined together, and the combined piezoresistive sensing transistors correspond to the pixels of the input image. Multiple input images may be acquired over multiple time periods, and differences between them used to derive information about input objects. For example, successive input images acquired over successive periods of time can be used to track the motion(s) of one or more input objects entering, exiting, and applying an input force.

In any of the above embodiments, multiple piezoresistive sensing transistors 212 may be ganged together such that the piezoresistive sensing transistors 212 are simultaneously received with. As compared to the methods described above, ganging together multiple piezoresistive sensing transistors 212 may produce a course input image that may not be usable to discern precise positional information. In one embodiment, the course input image may be used to move the processing system 110 or the input device 100 out of a doze or low power mode. In one embodiment, the course input image may be used to move the processing system 110 out of a doze mode or low power mode. In another embodiment, the course input image may be used to move a host device out of a doze mode or low power mode.

The background resistance, e.g., strain, of the input device 100 is the input image associated with no input object applying an input force. The background resistance changes with the environment and operating conditions, and may be estimated in various ways. For example, some embodiments take "baseline images" when no input object is determined to be applying an input force, and use those baseline images as estimates of their background resistances.

Input images can be adjusted for the background resistance of the input device 100 for more efficient processing. Some embodiments accomplish this by "baselining" measurements of the resistances at the force pixels to produce a "baselined input image." That is, some embodiments compare the measurements forming a form image with appropriate "baseline values" of a "baseline image" associated with those pixels, and determine changes from that baseline image.

In one or more embodiments, the input device 100 may be configured to detect and track multiple input objects simultaneously interacting with the input device. For example, the input device 100 may be able to detect the position of multiple input objects simultaneously interacting with the input device 100 as well as the amount of force applied by each input object. In other embodiments, the input device 100 may be able to detect a change in the shape or orientation of the input device. For example, the input device 100 may be able to detect when a force is applied to one or more sides of the input device 100 and/or when the sides of the input device 100 are bent toward each other in one or more directions.

As the input device 100 is configured to detect a change in resistance of the piezoresistive sensing transistor 212, the input device 100 may be able to detect various different types of input objects in various different types of environments. For example, in various embodiments, water may negatively affect the performance of an input device employing a capacitive sensing device. However, as the piezoresistive sensing transistors 212 are sensitive to applied force, an input device employing piezoresistive sensing transistors may continue to function properly even when submerged within water.

Figure 4:
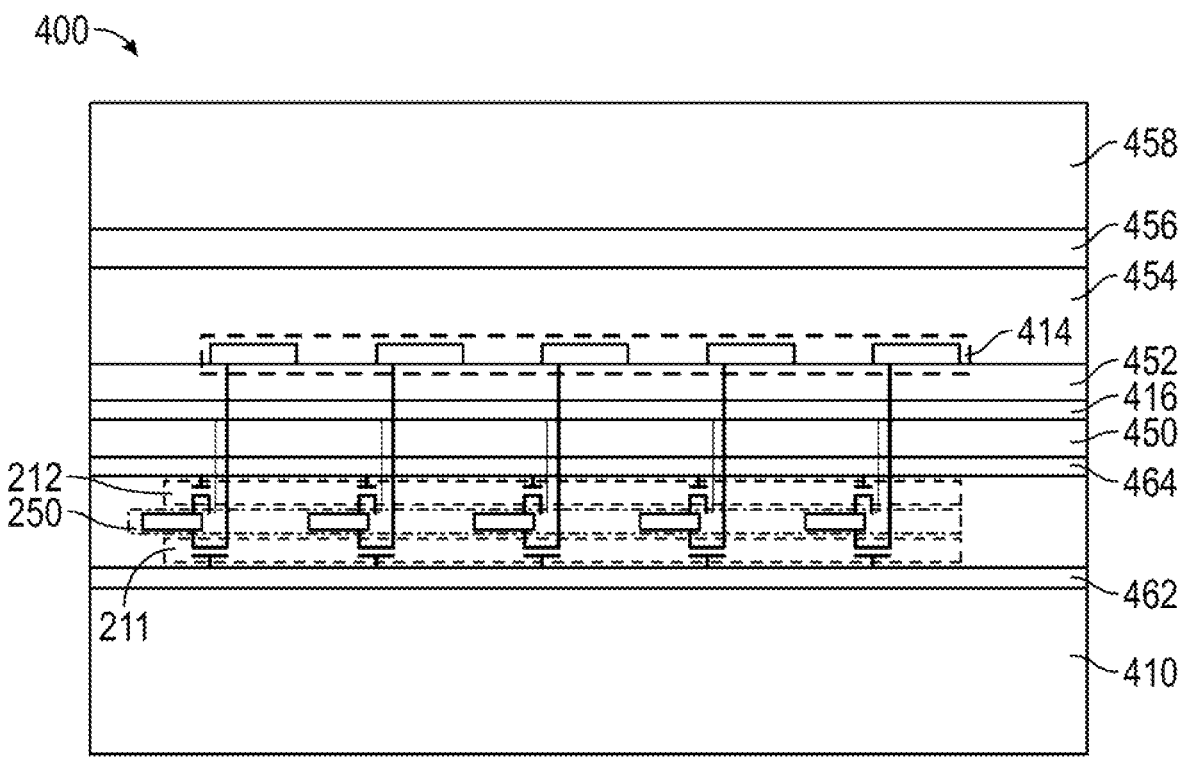
FIG. 4 illustrates an example input device, according to one or more embodiments.

FIG. 4 illustrates an embodiment of an input device according to one or more embodiments. For example, FIG. 4 illustrates display device 400 that is configured to sense an input applied by one or more input objects. The input may correspond to an input force. Display device 400 is an LCD device and comprises the piezoresistive sensing transistors 212 that are coupled to select lines 464, data lines 250 and a Vcom electrode 416. Further, the transistors 211 are coupled to the select lines 462, the data lines 250 and the subpixel electrodes 414. As is illustrated in FIG. 4, each pair of the piezoresistive sensing transistor 212 and the transistor 211 is coupled to a common data line 250. However, in other embodiments, the piezoresistive sensing transistors 212 and the transistors 211 may be coupled to the separate data lines 250. The display device 400 further includes a glass substrate 410, a passivation layer 450, a dielectric layer 452, a liquid crystal material layer 454, a color filter glass 456 and a lens 458. In various embodiments, the orientation of any of the illustrated layers may be changed. For example, the select lines 464 may be disposed below the select lines 462. Further, the display device 400 may include various layers not illustrated. For example, the display device 400 may include one or more polarizers and/or additional metal layers. Further, one or more layers illustrated in FIG. 4 may be omitted from the display device 400.

Each piezoresistive sensing transistor 212 may be referenced to the voltage applied to the Vcom electrode 416, or a common voltage of the display. As such, when the piezoresistive sensing transistors 212 experience strain due to an input applied by an input object, the current due to the voltage drop varies on each of the piezoresistive sensing transistors 212 experiencing strain.

In one embodiment, an input applied to the lens 458 applies a strain to one or more the piezoresistive sensing transistors 212. The resistance of the piezoresistive sensing transistors 212 changes in response to the applied force, altering the output current of the piezoresistive sensing transistors 212, across a prescribed voltage drop. When no input is applied to the lens 458, i.e., the piezoresistive sensing transistors 212 do not experience strain, substantially no change to the output current across the piezoresistive sensing transistor 212 exists.

A position and/or force measurement for each input object may be determined from the resulting signals received from each piezoresistive sensing transistor 212.

Figure 5:
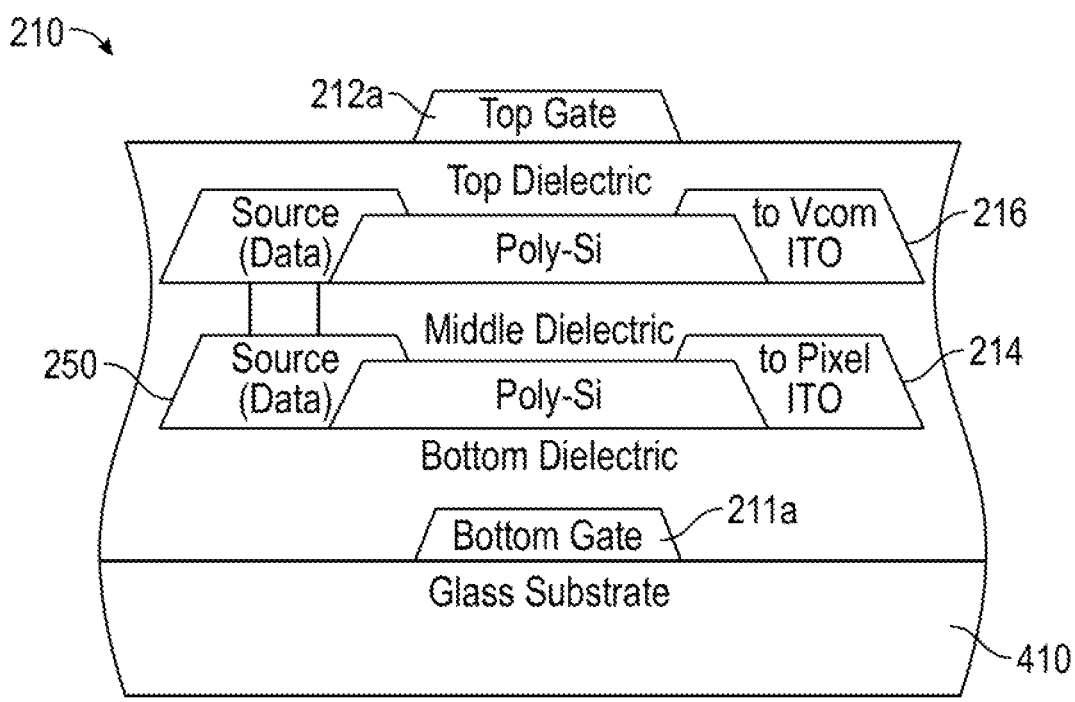
FIG. 5 illustrates an example subpixel, according to one or more embodiments.

FIG. 5 illustrates a side view of the subpixel 210 according to an embodiment. As is illustrated in FIG. 5, the transistors of subpixel 210 are vertically stacked. Stated another way, the transistors have a vertical orientation within the TFT layers of the corresponding display device. Specifically, FIG. 5 illustrates that a gate 212a is stacked above a gate 211a. In one embodiment, the gate 212a is the gate electrode of the piezoresistive sensing transistor 212 and the gate 211a is the gate electrode of the transistor 211. In other embodiments, the transistors of each subpixel may be disposed in other orientations. In one embodiment, the aperture ratio of an input device employing vertically stacked transistors as illustrated in FIG. 5 is similar to an aperture ratio of a standard display device, even though the input device may employ additional transistors. In one embodiment, by vertically stacking the transistors within an input device, the amount of space occupied by the vertically stacked transistors within the TFT layers may be similar to the amount of occupied by a space a single transistor within the TFT layers.

Figure 6A:
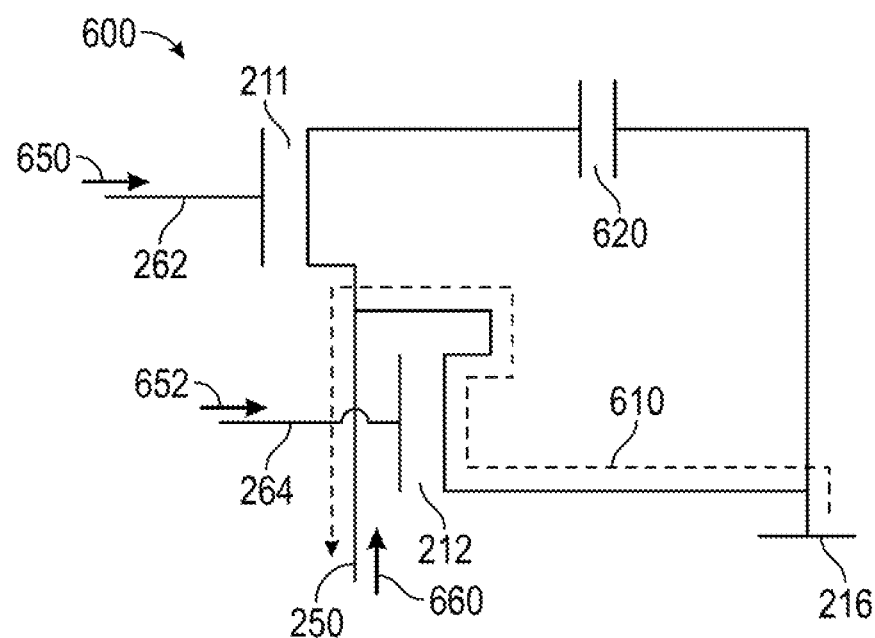
FIG. 6A illustrates an example subpixel, according to one or more embodiments.

FIG. 6A illustrates an example circuit schematic 600 depicting the circuit elements of a subpixel, e.g., the subpixel 210, according to an embodiment. Further, FIG. 6A illustrates current flow along path 610 through the piezoresistive sensing transistor 212. A capacitance 620 represents the capacitance between a subpixel electrode and a Vcom electrode.

Figure 6B:
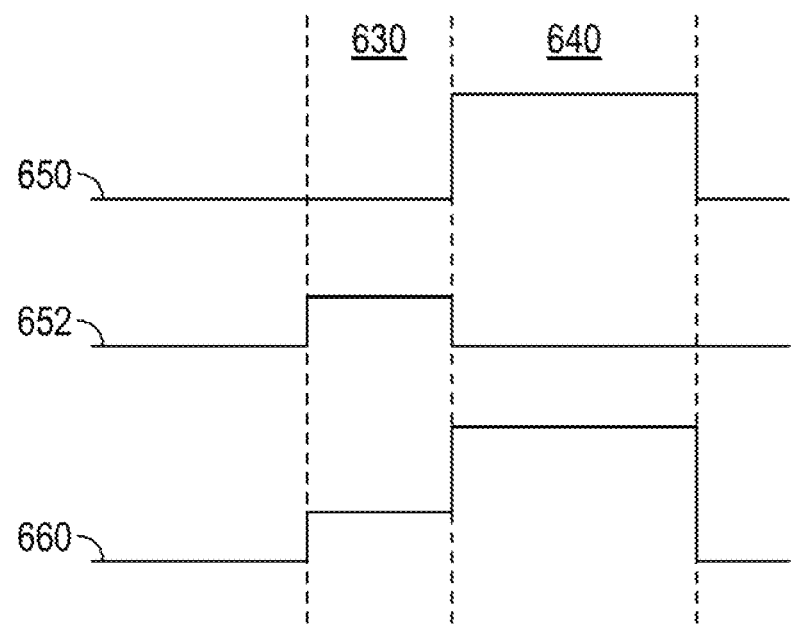
FIG. 6B illustrates a signal diagram, according to one or more embodiments.

FIG. 6B is a timing diagram, illustrating the voltages of the select and data signals applied to subpixel 210, according to an embodiment. During a period 640 of FIG. 6B, a select signal 650 is applied to the gate 262a of the transistor 211, and during a period 630, a select signal 652 is applied to a select line 264 couple to the gate of the piezoresistive sensing transistor 212. During period 630, the voltage level of select signal 652 configures the piezoresistive sensing transistor 212 to be in a linear range, such that the piezoresistive sensing transistor 212 functions as a variable resistor. Further, data line signal 660 configures data line 250 with a reference voltage to allow current to flow along path 610.

In one embodiment, as the variable resistance of the piezoresistive sensing transistor 212 changes in response to strain caused by an input of an input object, the amount of current that flows along path 610 also changes. During period 640, the select signal 650 applied to the select line 262 turns on the transistor 211, the select signal 652 applied to the select line 264 turns off the piezoresistive sensing transistor 212, and the data line signal 660 is driven on the data line 250 to update the subpixel. In one embodiment, the voltage value of select signal 650 during the period 630 differs from the voltage level of the select signal 650 during the period 640. For example, the voltage value of the select signal 650 during the period 630 is less than that of the voltage level of the select signal 650 during the period 640. Further, the voltage level of the data line signal 660 during the period 630 may be less than the voltage level of the data line signal 660 during the period 640. In one embodiment, during the period 630, the voltage of the data line signal 660 acts as a reference voltage for input sensing. In one embodiment, the reference voltage driven on the data line by data line signal 660 during period 630 differs from the voltage on the Vcom electrode 416.

In one or more embodiments, the period 630 may correspond to a non-display update period and the period 640 may correspond to a display update period.

Figure 7:
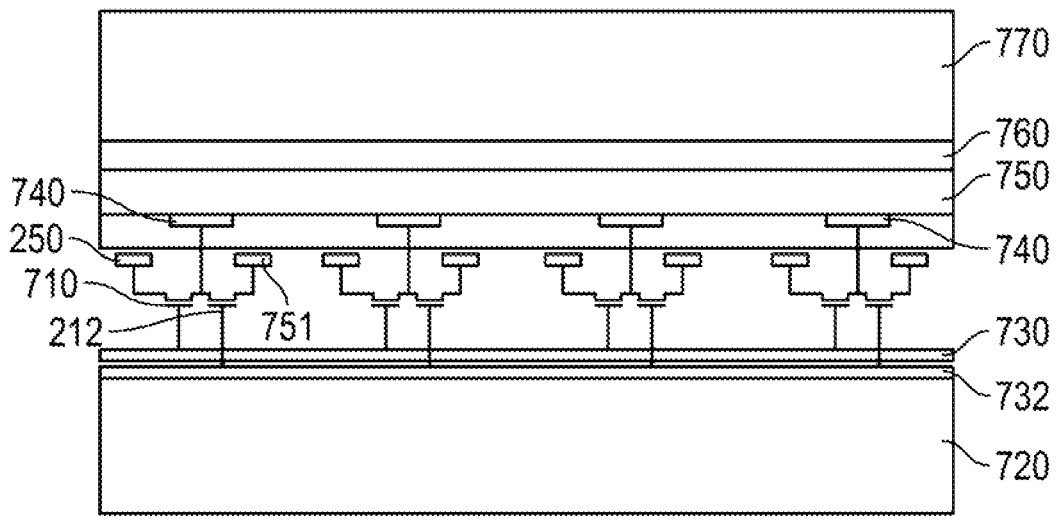
FIG. 7 illustrates an example input device, according to one or more embodiments.

FIG. 7 illustrates an embodiment of the input device 100 according to one or more embodiments. Specifically, FIG. 7 illustrates a display device 700 configured for input sensing. The display device 700 may be an OLED display device and comprise a substrate 720, select lines 732, select lines 730, the piezoresistive sensing transistors 212, transistors 710, data lines 250, anode electrodes 740, a supply voltage 751, organic layers 750, a cathode electrode 760, and a lens 770. In one embodiment, OLED display device may include one or more layers not illustrated in FIG. 7. Further, each subpixel of the OLED display device may include more than two transistors.

Each piezoresistive sensing transistor 212 may be coupled to the supply voltage 751 and to the transistor 710 which is coupled to the data line 250. Further, the piezoresistive sensing transistor 212 and the transistor 710 are coupled to an anode electrode 740. In other embodiments, the piezoresistive sensing transistor 121 may be coupled between the supply voltage 751 and the data line 250.

The supply voltage 751 is a supply voltage applied to each subpixel to drive subpixel for updating. In one embodiment, a positive supply voltage may be referred to as ELVDD and a negative supply voltage may be referred to as ELVSS.

In one embodiment, an input applied to the lens 770 applies a strain to one or more of the piezoresistive sensing transistors 212. The resistance of the piezoresistive sensing transistors 212 changes in response to the applied force, altering the output current of the piezoresistive sensing transistors 212 across a prescribed voltage drop between data lines 250 and the supply voltage 751. When no input is applied to lens 458, i.e., the piezoresistive sensing transistors 212 do not experience strain, substantially no change to the output current across piezoresistive sensing transistor 212 exists. In one embodiment, when no force is applied a bias current may flow through the piezoresistive sensing transistor 212. As force is applied, and the piezoresistive sensing transistor 212 experiences strain, the current varies in magnitude. A position and/or force measurement for each input object may be determined from the resulting signals received from each piezoresistive sensing transistor.

In various embodiments, the polarity of the current output due to strain of the piezoresistive sensing transistor 212, may have the same polarity regardless if the force is of a tension type of force or compression type of force.

As compared to the embodiment of FIG. 4, the piezoresistive sensing transistors of the display device 700 may be configured for both display updating and input sensing, while the piezoresistive sensing transistors of display device 400 may be configured for only input sensing.

Figure 8A:
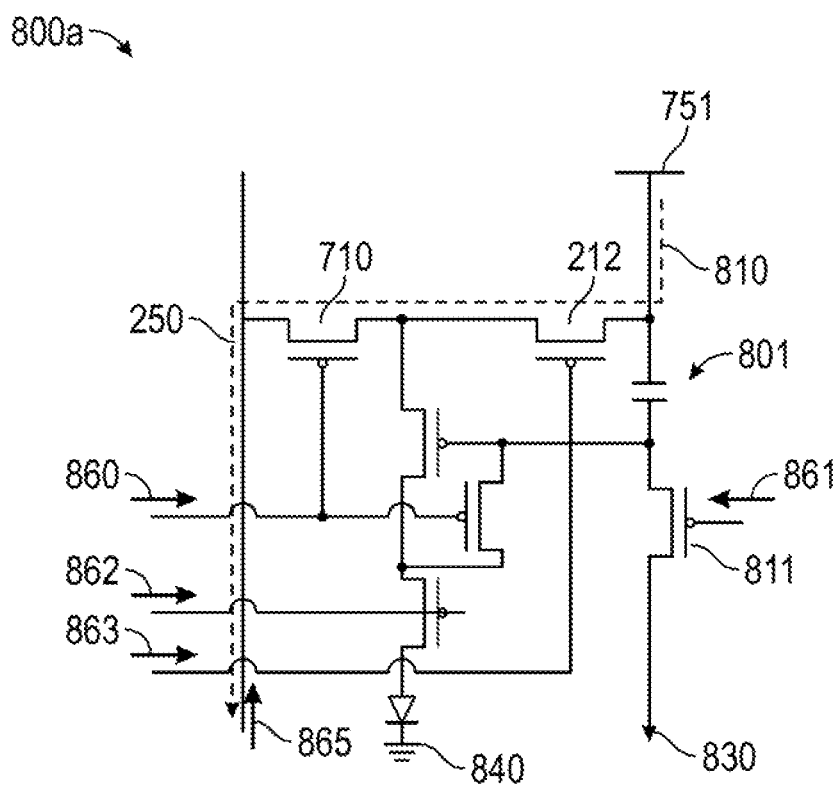
FIG. 8A illustrates an example subpixel, according to one or more embodiments.

FIG. 8A illustrates an example sensor schematic 800a of a subpixel of an OLED display device according to one or more embodiments. The particular subpixel configuration of FIG. 8A may be referred to as a 6 transistor subpixel, however, in other embodiments; other subpixel configurations having differing number of transistors may be utilized.

The current path 810 illustrates example path that current flows when the piezoresistive sensing transistor 212 is operated in the linear range for input sensing. As the resistance of piezoresistive sensing transistor 212 varies in response to strain caused by an input applied by an input object, the change in resistance of the piezoresistive sensing transistor(s) 212 induces a change in the current across a voltage drop between supply voltage 751 and the reference voltage on data line 250.

In one embodiment, the transistor 710 may also be configured as a piezoresistive sensing transistor, having resistance that varies in response to stain caused by an input applied by an input object. Further, in one or more embodiments, the transistor 710 may be configured as a piezoresistive sensing transistor, while the piezoresistive sensing transistor 212 may be configured for only display updating.

Figure 8C:
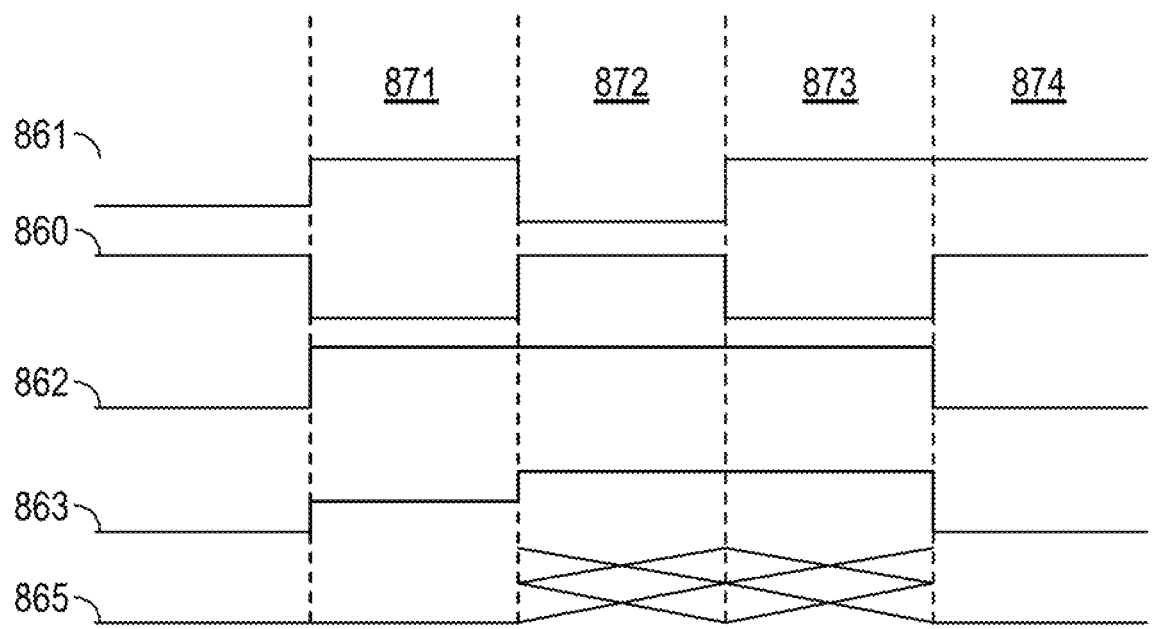
FIG. 8C illustrates a signal diagram, according to one or more embodiments.
Figure 8B:
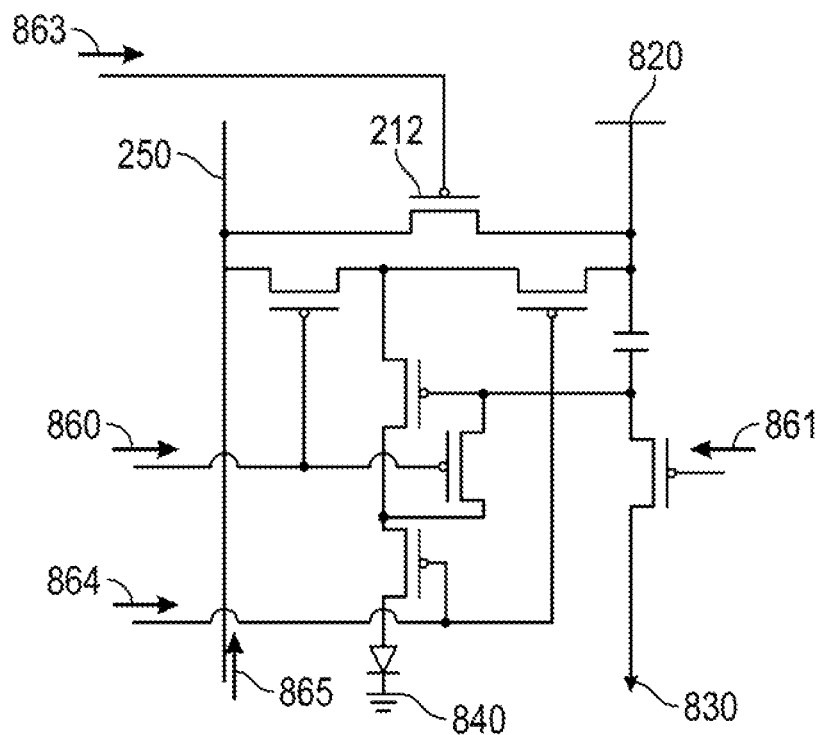
FIG. 8B illustrates an example subpixel, according to one or more embodiments.

As shown in the embodiment of FIG. 8B, the subpixel 800b includes the piezoresistive sensing transistor 212 disposed between the data line 250 and the supply voltage 820. However, as compared to the embodiment of FIG. 8A, the piezoresistive sensing transistor 212 is configured for input sensing and not display updating.

FIG. 8C is a timing diagram for performing display updating and input sensing according to one or more embodiments. During the period 871, the select signals 861 and 862 maintain the corresponding transistors in an off position, the signal 860 is driven low to turn on the transistor 710, and the signal 863 is driven to a voltage level that places the piezoresistive sensing transistor 212 in a linear range to perform input sensing. In one or more embodiments, the signal 861 may be a select signal of another display line. For example, the signal 861 may be a select signal of a display line that precedes the display line including subpixel 801.

In one embodiment, the voltage level may be half way between the on voltage level and the off voltage level for the piezoresistive sensing transistor. In other embodiments, other voltage levels may be used. Further, the period 871 may be referred to as a non-display update period. During the period 871, in response to an input force applied to lens 770, the resistance of the piezoresistive sensing transistor 212 varies, altering the current of the resulting signal output over the data line 250.

During the period 872, the signal 863 is driven high to turn off the piezoresistive sensing transistor 212, and the signal 861 is driven low to initialize the subpixel 800a for updating. During the period 872 the subpixel 800a is driven with the voltage 830. In one embodiment, the voltage 830 may be referred to as an initialization voltage (Vint) or a reference voltage. In various embodiments, one or more subpixels of another display line, e.g., a display line other than the display line comprising subpixel 801, may be driven for input sensing between the period 871 and 872, such that there is a period of time between periods 871 and 872. For example, a piezoresistive sensing transistor of another subpixel of another display line may be placed in a linear range to perform to function as a piezoresistive sensor for input sensing after input sensing has occurred with subpixel 801 and before subpixel is initialized during the period 872.

During the period 873, the signal 860 is driven low to program the subpixel. Further during the period 873, the subpixel data signal applied to the data line 250 is stored at the subpixel. During the period 874, the select signals 861 and 860 are driven high, and the select signals 862 and 863 are driven low placing the subpixel 800*b* in an emission stage during which the subpixel 800*a* emits an amount of light corresponding to the subpixel data signal programmed through the data lines 250. In other embodiments, the voltage levels of the select signal may have an opposite polarity depending on the type of transistors employed within the subpixels.

In one embodiment, multiple rows of subpixels may be sequentially scanned and used for input sensing during period 871. In other embodiments, multiple rows of subpixels may be simultaneously used for input sensing during period 871.

In one or more embodiments, the transistor 811 may be coupled to the data line 250 instead of the voltage 830. In such embodiments, the voltage 830 may be omitted. Further, during the period 872 (e.g., the initialization period of the subpixel), the signal 865 is driven with a direct current (DC) voltage biased at Vint. Further, such an embodiment may combine the periods 871 and 872 of FIG. 8B and input sensing may be completed by measuring current across a voltage drop of the voltage 820 (e.g., supply voltage ELVDD) and Vint on the data line 250.

In one or more embodiments, the subpixel 800*b* may be operated for input sensing and display updating using the signals illustrated in timing diagram of FIG. 8C. In one embodiment, the signals 860, 861 and 864 are configured to activate, initialize, and program the subpixel 800*b* for display updating. Further, the signal 863 is configured to place the piezoresistive sensing transistor 212 in a linear range for input sensing. In one embodiment, input sensing may be performed with the piezoresistive sensing transistor 212 during a period of time that at least partially overlaps with when the subpixel 800*b* is initialized, before the subpixel 800*b* is programmed, and/or when the subpixel 800*b* is not selected for updating.

Figure 8D:
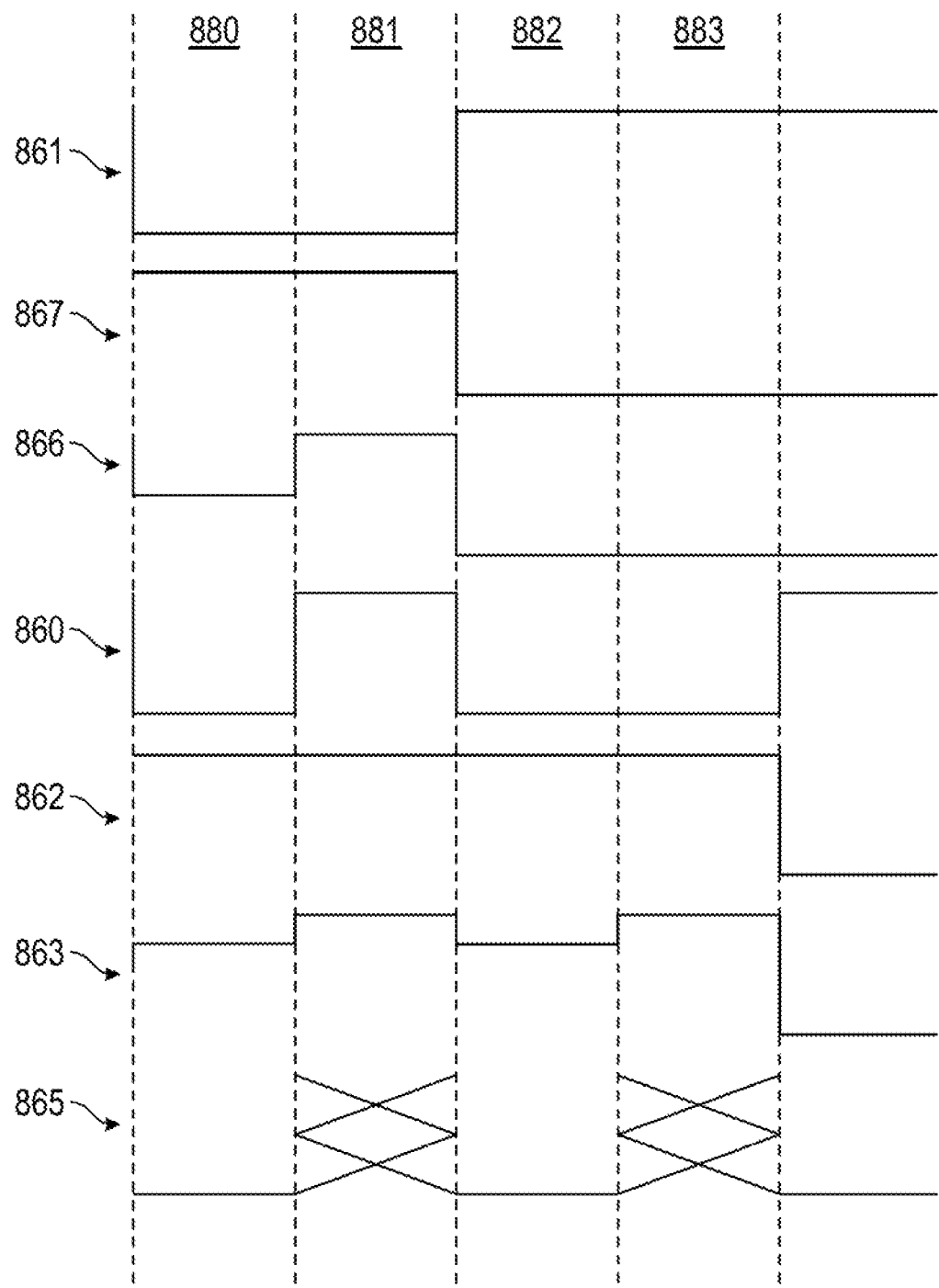
FIG. 8D illustrates a signal diagram, according to one or more embodiments.
Figure 8E:
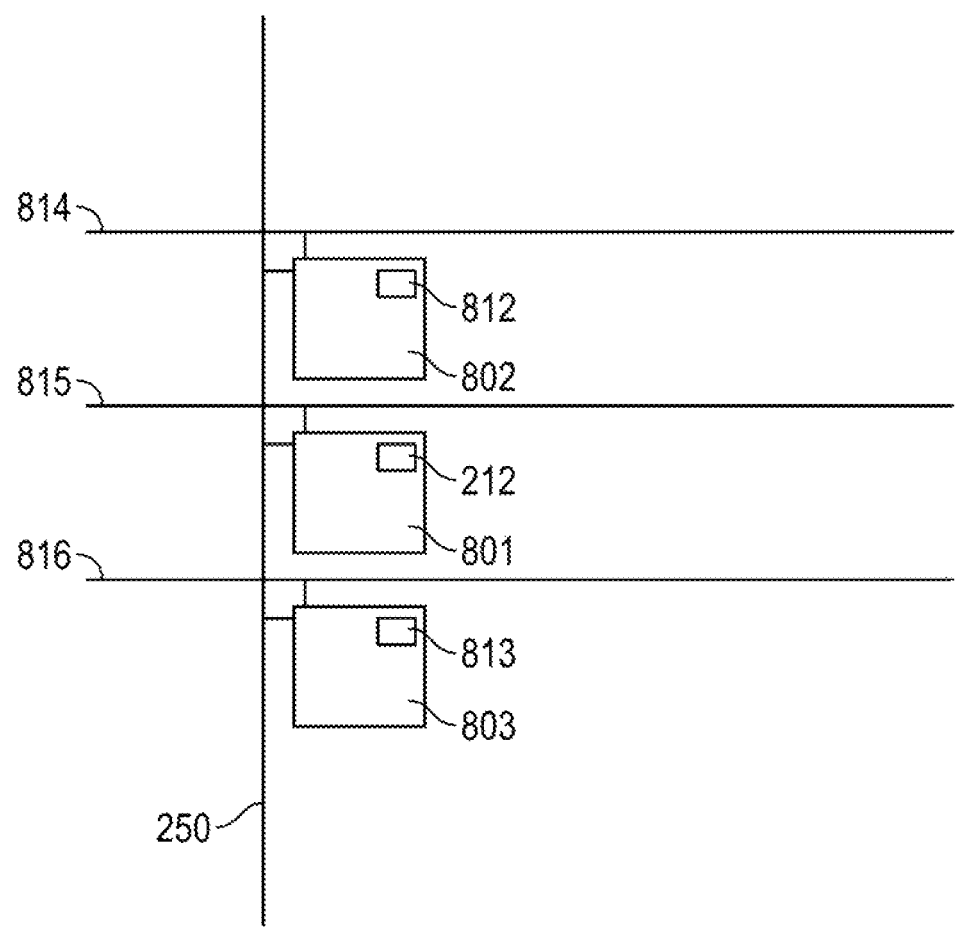
FIG. 8E illustrates an example subpixel layout, according to one or more embodiments.

FIG. 8D illustrates a timing diagram which may be used in conjunction with subpixels 801-803 of display lines 814-816, respectively, as illustrated in FIG. 8E. As compared to the timing diagram of FIG. 8C, the timing diagram of FIG. 8D comprises signals that are used to drive two different subpixels of different display lines. For example, the signals 860, 862, and 863 may be used to update a first subpixel of a first display line (e.g., subpixel 801 of display line 815) and the signals 861, 866 and 867 may be used to update a second subpixel of a display line (e.g., subpixel 802 of display line 814). In one or more embodiments, the waveforms of signals 861, 867 and 866 are time shifted versus of waveforms of signals 860, 862, and 863, respectively.

In one or more embodiments, one or more subpixels may share a common data line, e.g., the data line 250. Further, as input sensing may be performed simultaneously with at least two subpixels coupled to a shared data line, a resulting signal received via the shared data line may correspond to a change in resistance of multiple piezoresistive sensing transistors. In one or more embodiments, as display lines are selectively activated and deactivated for display updating and input sensing, while the subpixels of data line "N" are initialized, the resulting signals received from each data line are a combination of the change in resistance of the piezoresistive sensing transistor of a subpixel of display line "N" and the piezoresistive sensing transistor of a subpixel of a preceding data line "N−1," which are coupled to a common data line.

In one or more embodiments, sensing may be performed on the subpixels of a first display line, e.g., the display line 815, while each of those subpixels is initialized and before each of those subpixels is programed. For example, input sensing may be performed with the subpixel 801 during a period time that at least partially overlaps with when the subpixel 801 is initialized. Further, input sensing may be performed with the subpixel 802 during a period time that at least partially overlaps with when the subpixel 802 is initialized, and input sensing may be performed with subpixel 803 during a period time that at least partially overlaps with when the subpixel 803 is initialized.

With further reference to the timing diagram of FIG. 8D, during the period 880, the signal 861 is driven low, turning on the transistor 811. Further, during the period 880, the signal 860 is driven low, the signal 862 is driven high and the signal 863 is driven to an intermediate voltage (e.g., a voltage level that is between the high voltage level and the low voltage level), placing the piezoresistive sensing transistor 212 in a linear range such that it functions as a resistor. Further, turning on the transistor 811 initializes the subpixel 801 to voltage 830. In one embodiment, the voltage 830 may be provided via the data line 250, and the transistor 811 is connected to the data line 250. Further, the data line 250 may be held at a reference voltage, such as an initialization voltage during the period 880.

Additionally, during period 880, the signal 866 is driven to an intermediate voltage placing the piezoresistive sensing transistor 812 of the subpixel 802 shown in FIG. 8E in a linear range. Accordingly, during the period 880 both of the piezoresistive sensing transistors 212 and 812 may be placed in a linear range. In one or more embodiments, any change in resistance of the piezoresistive sensing transistors 212 and 812 will be represented within a common resulting signal output on the data line 250, during the period 880.

During the period 881, the signal 866 is driven high and the signal 865 is a data signal to program subpixel 802. Further, in one or more embodiments, input sensing does not occur during the period 881, while the subpixel 802 is programmed with the data signal.

During the period 882, input sensing is performed with the piezoresistive sensing transistor 212 of the subpixel 801. For example, the signal 860 is driven low and the signal 863 is driven to an intermediate voltage (e.g., a voltage level that is between the high voltage level and the low voltage level), placing the piezoresistive sensing transistor 212 in a linear range such that the piezoresistive sensing transistor is configured for input sensing. Further, during the period 882, the signals 867 and 866 are driven low and the signal 861 is driven high to place the subpixel 802 in an emission period, initializing the subpixel 803 to voltage 830. Further, the data line 250 is held at a reference voltage, e.g., the signal 865, and a resulting signal corresponding to a change of resistance of the piezoresistive sensing transistor 212 may be received via the data line 250.

In one or more embodiments, during the period 882, the subpixel 803 may be initialized with the reference signal driven on the data line 250. Further, during the period 882, the subpixel 803 may be configured for input sensing as the piezoresistive sensing transistor 813 is placed in a linear range and is configured to function as a resistor.

During the period 883, the signal 863 is driven high, and the subpixel 801 is programmed with the signal 865 driven on the data line 250. In one embodiment, during the period 883, input sensing on any subpixel coupled to the data line 250 may not be performed.

In one embodiment, one or more periods may occur between the periods 881 and 882. In other embodiments, during the period 882 input sensing may not occur, such that input sensing only occurs during the period 880. For example, the signal 863 may not be driven to an intermediate voltage during the period 882. Further, in one or more embodiments, during the period 880 input sensing may not occur, such that input sensing only occurs during the period 882. For example, the signal 863 and/or the signal 866 may not be driven to an intermediate voltage during the period 880. In other embodiments, the voltage levels of the signals illustrated in FIG. 8D may have a different polarity depending on the type of transistors employed within the subpixels, e.g., different voltage may be used for either NMOS or PMOS transistors.

In one embodiment, the resulting signals received during the periods 880 and 882 may be combined and used to determine a force measurement for an input object.

In one or more embodiments, both of the timing diagrams of FIG. 8B and FIG. 8D may be combined such that input sensing may occur during various different periods. For example, input sensing may occur with one more subpixels during the period 871, and also during the periods 880 and/or 882.

Figure 9A:
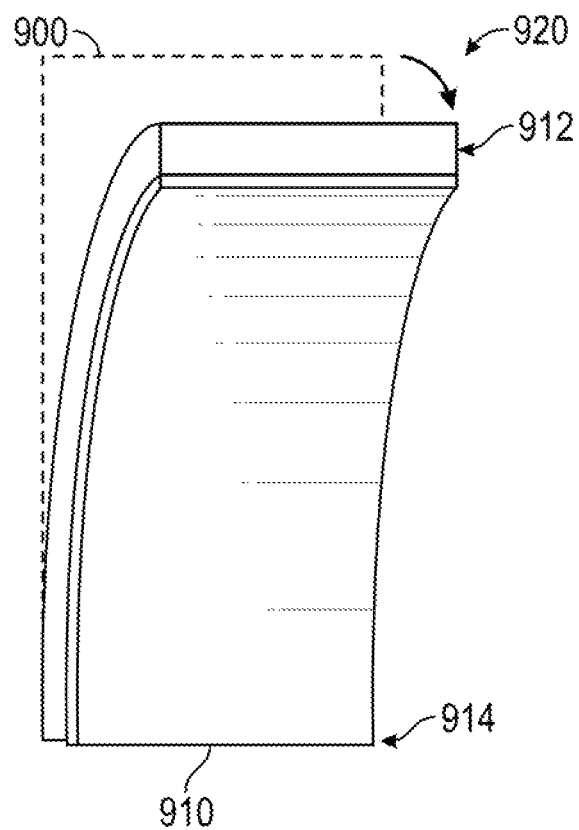
FIGS. 9A and 9B illustrates example force gestures, according to one or more embodiments.
Figure 9B:
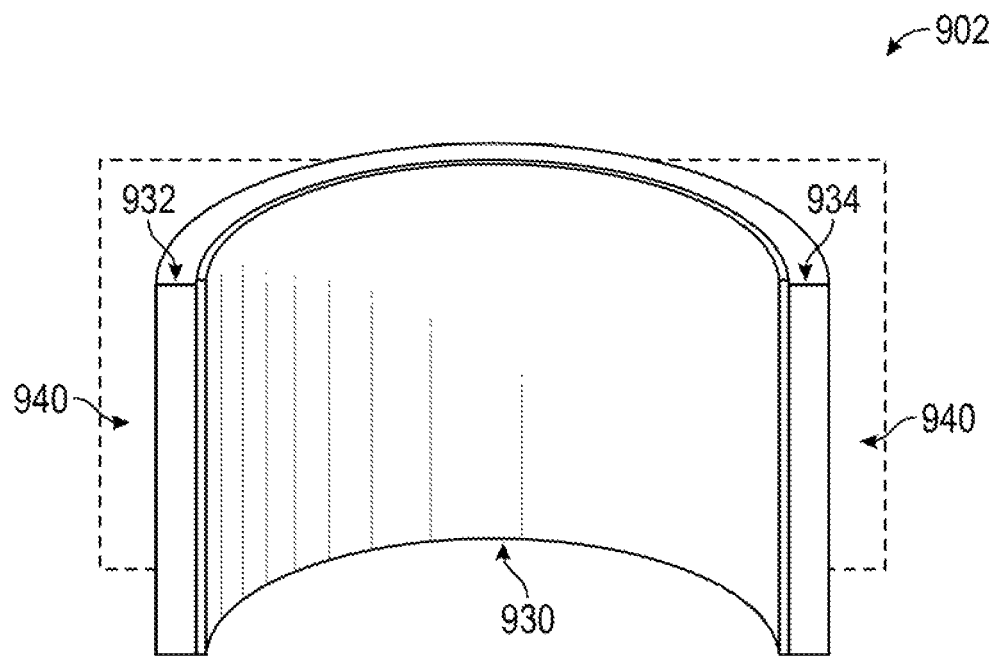

FIGS. 9A and 9B illustrate two example input force gestures that may be detected by the input device. As shown in FIG. 9A, an input force 920 of an input force gesture 900 is applied to a single edge, e.g., an edge 912, of an input device 910, bending an edge 912 toward an edge 914. FIG. 9B illustrates input forces 940 of input an force gesture 902 are applied to both edges, e.g., edges 932 and 934, of an input device 930, bending the edges toward each other. In various embodiments, the input force gestures 900 and 902 may be used to alter a feature of the input device 910 and/or 930. For example, the input force gestures 900 and/or 902 may be employed to launch a camera application, a music application and/or a video viewing application.

Figure 10:
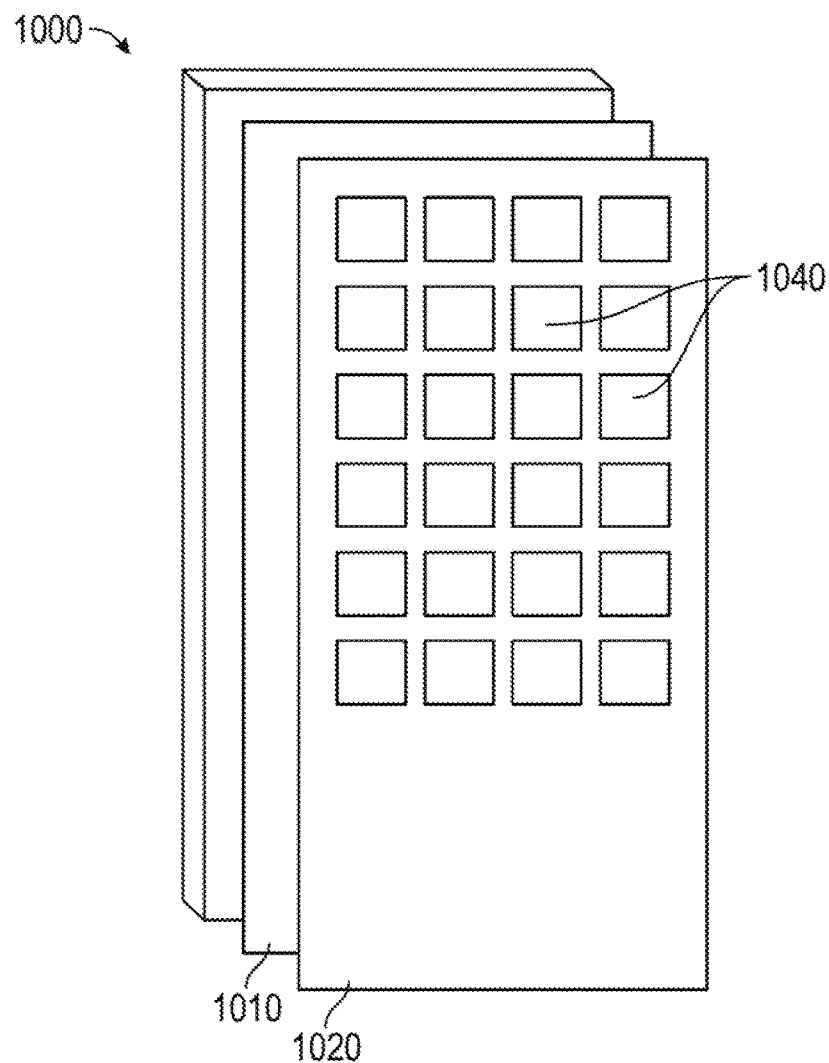
FIG. 10 illustrates an example input device, according to one or more embodiments.

FIG. 10 includes an alternative embodiment of an input device, e.g., the input device 100, including both a piezoresistive sensing device 1010 and a proximity sensing device 1020. The piezoresistive sensing device 1010 may be configured based on any of the above described embodiments employing piezoresistive sensing transistors. Further, the proximity sensing device 1020 may employ capacitive, elastive, resistive, inductive, magnetic, acoustic, ultrasonic, and/or optical techniques. For example, the proximity sensing device 1020 may include a plurality of sensor electrodes 1040.

In one embodiment, the sensor electrodes 1040 may function as capacitive sensor electrodes. For example, some capacitive implementations utilize "self-capacitance" (also often referred to as "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage, e.g. system ground, and by detecting the capacitive coupling between the sensor electrodes and input objects.

Further, some capacitive implementations utilize "mutual capacitance" (also often referred to as "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also referred to herein as "transmitter electrodes" or "transmitters") and one or more receiver sensor electrodes (also referred to herein as "receiver electrodes" or "receivers"). Transmitter sensor electrodes may be modulated relative to a reference voltage, e.g., system ground, to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference, e.g. other electromagnetic signals. Sensor electrodes may be dedicated transmitter electrodes or receiver electrodes, or may be configured to both transmit and receive.

In one or more embodiments, the sensor electrodes may be any shape such as circular, rectangular, diamond, star, square, noncovex, convex, nonconcave concave, etc.

The sensor electrodes may be discrete sensor electrodes, such that they are separate from a display device of the input device 1000. In some embodiments, one or more of the sensor electrodes include one or more display electrodes used in updating the display of the display screen. In one or more embodiment, the display electrodes comprise one or more segments of a common voltage electrode, also referred to as a Vcom electrode, a source drive line, gate line, an anode electrode or cathode electrode, or any other display element. These display electrodes may be disposed on an appropriate display screen substrate. For example, in display screens such as In Plane Switching (IPS) and Plane to Line Switching (PLS) Organic Light Emitting Diode (OLED), the display electrodes may be disposed on a transparent substrate, e.g., a glass substrate, TFT glass, or any other transparent material,). In other embodiments, in display screens such as Patterned Vertical Alignment (PVA) and Multi-domain Vertical Alignment (MVA), the display electrodes may be disposed on the bottom of a color filter glass. In one or more embodiments, the display electrodes may be disposed over an emissive layer of an OLED display. In such embodiments, an electrode that is used as both a sensor electrode and a display electrode can also be referred to as a combination electrode, since it performs multiple functions.

The sensor electrodes 1040 may be driven for capacitive during one or more of the non-display update periods. In one or more embodiments, the sensor electrodes 1040 may be driven for capacitive sensing during a first non-display update period and the piezoresistive sensing transistors 212 may be driven for piezoresistive sensing during a second non-display update period. The first and second non-display update periods may be of a common type, e.g., both long horizontal blanking periods, or of different types, e.g., the first blanking period is a long horizontal blanking period and the second blanking period is a vertical blanking period. In other embodiments, the sensor electrodes 1040 may be driven for capacitive sensing during and the piezoresistive sensing transistors 212 may be driven for piezoresistive sensing during a common non-display update period.

In one embodiment, the output of proximity sensing device 1020 may be used to alter a function of piezoresistive sensing device 1010. For example, the output of proximity sensing device 1020 may provide an indication to the piezoresistive sensing device 1010 to switch from a doze mode to an active sensing mode. In one embodiment, the output of the proximity sensing device 1020 may be configured to control where sensing is performed within the piezoresistive sensing device 1010. For example, the piezoresistive sensing device 1010 may perform piezoresistive sensing in regions where an input object is reported by proximity sensing device 1020. Further, in one embodiment, the proximity sensing device 1020 may be configured to report position of an input object and the piezoresistive sensing device 1010 is configured to report a force measurement. In one embodiment, the position of an input object determined by the proximity sensing device 1020 is compared with the position of the input object determined by the piezoresistive sensing device 1010 to confirm the location of the input object. In one embodiment, the piezoresistive sensing device 1010 may be utilized to determine positional information of an input object in instances where the proximity sensing device 1020 is not able to function correctly. For example, if the device is placed underwater, the proximity sensing device 1020 may not be able to accurately detect an input object due to the environment. However, the piezoresistive sensing device 1010 may be utilized in such circumstances to detect an input object as the piezoresistive sensing device 1010 is able to determine changes in resistance due to strain applied by an input object in such an environment.

Figure 11:
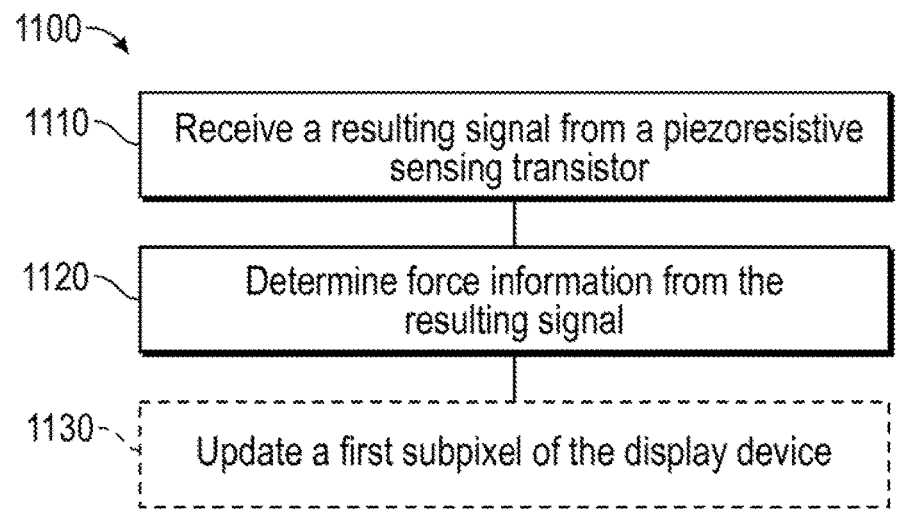
FIG. 11 is a flow chart illustrating an example input sensing method, according to one or more embodiments.

FIG. 11 illustrates a method for performing piezoresistive sensing. At step 1110 a resulting signal is received from a piezoresistive sensing transistor. For example, a gate of the piezoresistive sensing transistor 212 is driven with a select signal configured to place the piezoresistive sensing transistor in a linear range, such that the piezoresistive sensing transistor functions as a resistor. In response to an input applied by an input object, the piezoresistive sensing transistor 212 experiences strain which causes the resistance of the piezoresistive sensing transistor 212 to change. As such, the output current of the piezoresistive sensing transistors 212 is altered across a prescribed voltage drop between the data lines 250 and a supply voltage. The supply voltage may be a common voltage of a display device, e.g., Vcom voltage, ELVDD, ELVSS, or the like.

The current flowing through the piezoresistive sensing transistor 212 changes in response to the resistance change of the piezoresistive sensing transistor, and is received by sensor module 220 via a data line coupled to the corresponding subpixel as a resulting signal. In one embodiment, the sensor module 220 is configured to receive the resulting signal, process the resulting signal and communicate the processed resulting signal to the determination module 270.

In one embodiment, the sensor module 220 and/or the display driver module 230 is configured to provide a control signal to the selection circuitry 240, instructing the selection circuitry 240 to active one or more subpixels for input sensing. In various embodiments, input sensing corresponds to one or more of force sensing and touch sensing. The subpixels may be selected a row or a partial row at a time for input sensing. In response to the control signal, the selection circuitry 240 may output a first select signal to a first one or more select lines to activate the corresponding piezoresistive sensing transistors for input sensing and a second one or more select lines to deactivate the other transistors of the subpixels for display updating. In one embodiment, while input sensing is performed, each of the subpixels configured for display updating may be turned off. In one or more embodiments, the control signal provides an indication of how long to perform for input sensing, which piezoresistive sensing transistors to activate, and/or the order to active the piezoresistive sensing transistors.

At step 1120, force information for an input object is determined. In one embodiment, the determination module 270 is configured to determine force information for each of one or more input objects that is applying an input force from on the processed resulting signals. In one embodiment, the force information may be used to determine a magnitude of force applied by an input object, a change in force applied by an input object, and/or whether or not a threshold amount of force has been applied by an input object. In one or more embodiments, multiple input objects may simultaneously apply an input force, and force information may be determined for each of the input objects. Further, the determination module 270 may be configured to determine positional information in addition and/or alternatively to the force information from the processed resulting signals. In one embodiment, the determination module 270 receives the processed resulting signal or signals from the sensor module 220 and determines a measurement of the input force from the processed resulting signal(s). In one embodiment, the determination module 270 receives the processed resulting signals from sensor module 220, compares the processed resulting signals to a baseline, and determines measurements of changes in resistance for the piezoresistive sensing transistors. Further, the determination module 270 may be configured to determine an input image from the measurements of changes in resistance.

At step 1130, a first subpixel of the display device is updated. In one embodiment, the first subpixel is updated during a display update period and input sensing is performed during a non-display update period that is non-overlapping with the display update period. Further, the display driver module 230 and/or the sensor module 220 may be configured to communicate a control signal to the selection circuitry 240 to instruct the selection circuitry 240 to active one or more subpixels for display updating. In one embodiment, the control signal indicates which subpixels to active for display updating.

These and other advantages maybe realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" are used as the plain-English equivalents of the respective terms "comprising" and "wherein." Moreover, in the following claims, the terms "first," "second," and "third," etc. are used merely as labels, and are not intended to impose numerical requirements on their objects.

What is claimed is:

1. A method for display updating and input sensing, the method comprising:

during a first period, turning on, by a sensing device, a first transistor of the sensing device by applying a first select signal to a gate of the first transistor, and turning off, by the sensing device, a first piezoresistive sensing transistor of the sensing device, wherein the first period corresponds to a display updating period, and wherein during the first period, the first transistor couples a first data signal from a first data line to a first subpixel of a display device;

during a second period, operating, by the sensing device, the first piezoresistive sensing transistor as a resistor by applying a second select signal to a gate of the first piezoresistive sensing transistor, and turning off, by the sensing device, the first transistor, wherein the second period corresponds to an input sensing period, and wherein during the second period, the first piezoresistive sensing transistor outputs a first resulting signal onto the first data line, wherein the first resulting signal corresponds to a change in resistance of the first piezoresistive sensing transistor;

determining, by the sensing device, at least partially based on the change in resistance, force information for an input object; and determining, by the sensing device, an amount of force applied by the input object using the force information.

2. The method of claim 1, wherein during the first period, the first data line coupled to the first subpixel is driven with a first subpixel data signal; and wherein a voltage level of the second select signal differs from a voltage level of the first select signal.

3. The method of claim 2, wherein the first period and the second period are non-overlapping, and during the second period the first data line is driven with a reference voltage different than the first subpixel data signal.

4. The method of claim 1, further comprising:

updating, during the first period, a second subpixel of the display device by:

driving a second transistor of the second subpixel with a third select signal;

driving a second data line coupled to the second subpixel with a second subpixel data signal; and obtaining, during the first period, a second resulting signal via a second piezoresistive sensing transistor.

5. A sensing device, comprising:

a plurality of data lines of a display device;

a plurality of subpixels coupled to the plurality of data lines, wherein a first subpixel of the plurality of subpixels is coupled to a first data line of the plurality of data lines, and the first subpixel comprises:

a first transistor configured to couple a first data signal from the first data line to the first subpixel in response to receiving a first select signal during a first period; and a first piezoresistive sensing transistor configured to output a first resulting signal onto the first data line in response to receiving a second select signal during a second period, wherein the first resulting signal corresponds to a change in resistance of the first piezoresistive sensing transistor; and a processing system coupled to the plurality of subpixels and configured to:

receive the first resulting signal via the first data line;

determine, at least partially based on the first resulting signal, force information for an input object; and determine an amount of force applied by the input object using the force information;

wherein the first period corresponds to a display updating period, and wherein the processing system is further configured to, during the first period, turn on the first transistor by applying the first select signal to a gate of the first transistor and turn off the first piezoresistive sensing transistor; and wherein the second period corresponds to an input sensing period, and wherein the processing system is further configured to, during the second period, operate the first piezoresistive sensing transistor as a resistor by applying the second select signal to a gate of the first piezoresistive sensing transistor and turn off the first transistor.

6. The sensing device of claim 5, wherein the first piezoresistive sensing transistor is further coupled to a supply voltage.

7. The sensing device of claim 5, wherein the first transistor and the first piezoresistive sensing transistor differ in at least in one of doping concentration, resistance, and size.

8. The sensing device of claim 5, wherein a voltage level of the second select signal is less than a voltage level of the first select signal.

9. The sensing device of claim 5, wherein the first piezoresistive sensing transistor is configured to operate as a resistor based on the first piezoresistive sensing transistor being driven in a linear range by the second select signal.

10. The sensing device of claim 9, wherein a resistance of the first piezoresistive sensing transistor when driven in the linear range is at least 100 kilo-ohms.

11. The sensing device of claim 5, wherein a second subpixel of the plurality of subpixels is coupled to a second data line of the plurality of data lines, and the second subpixel comprises:

a second transistor configured to couple a second data signal from the second data line to the second subpixel in response to receiving the first select signal during the first period; and a second piezoresistive sensing transistor configured to output a second resulting signal onto the second data line in response to receiving the second select signal during the second period, wherein the second resulting signal corresponds to a change in resistance of the second piezoresistive sensing transistor.

12. The sensing device of claim 5, wherein the first piezoresistive sensing transistor is disposed in a first metal layer of the display device, and the first transistor of the first subpixel is disposed in a second metal layer of the display device, and wherein the first metal layer is between a lens of the display device and the second metal layer.

13. A processing system for input device, the processing system comprising:

a display driver module comprising display driver circuitry, wherein the display driver module is configured to:

apply a first select signal to a gate of a first transistor of a first subpixel of a display device during a first period, wherein the first period corresponds to a display updating period; and drive a first data signal onto a first data line of the display device coupled to the first subpixel during the first period;

a sensor module comprising sensor circuitry, wherein the sensor module is configured to:

apply a second select signal to a gate of a piezoresistive sensing transistor of the first subpixel during a second period to operate the piezoresistive sensing transistor as a resistor during the second period, wherein the second period corresponds to an input sensing period; and receive a first resulting signal from the first data line during the second period, the first resulting signal corresponding to a change in resistance of the piezoresistive sensing transistor; and a determination module configured to:

determine force information for an input object at least partially based on the first resulting signal; and determine an amount of force applied by the input object using the force information;
wherein the sensor module is further configured to turn off the piezoresistive sensing transistor during the first period; and
wherein the display driver module is further configured to turn off the first transistor during the second period.

14. The processing system of claim 13, wherein a voltage level of the second select signal corresponds to a linear range of the piezoresistive sensing transistor, so as to operate the piezoresistive sensing transistor as a resistor.

15. The sensing device of claim 5, wherein
during the first period, no current flows through the first piezoresistive sensing transistor, and the first data signal flows through the first transistor from the first data line to a first display electrode; and
wherein during the second period, no current flows through the first transistor, a supply voltage flows through the first piezoresistive sensing transistor from a power source to the first data line, and the first data line provides a reference voltage.

16. The sensing device of claim 15, wherein the second select signal has a lower voltage than the first select signal, and wherein the first data line has a lower voltage during the second period than during the first period.

17. The sensing device of claim 5, wherein the first transistor and the first piezoresistive sensing transistor are arranged in a vertically-stacked configuration comprising three dielectric layers, wherein one gate of the two transistors is arranged proximate to the top of a top dielectric layer of the three dielectric layers, and the other gate of the two transistors is arranged proximate to the bottom of a bottom dielectric layer of the three dielectric layers.

18. The sensing device of claim 5, wherein the first transistor and the first piezoresistive sensing transistor are arranged in series.

19. The sensing device of claim 5, wherein the processing system is further configured to:
after the second period and prior to the first period, initialize the first subpixel for display using an initialization voltage.

* * * * *